United States Patent
Ha et al.

(10) Patent No.: US 8,834,670 B2
(45) Date of Patent: *Sep. 16, 2014

(54) OPTICAL ADHESIVE COMPOSITION AND DISPLAY PANEL INCLUDING THE SAME

(75) Inventors: Kyoung Jin Ha, Uiwang-si (KR); Ji Hye Kwon, Uiwang-si (KR); Kil Sung Lee, Uiwang-si (KR); Irina Nam, Uiwang-si (KR); Lee June Kim, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 16 days.

This patent is subject to a terminal disclaimer.

(21) Appl. No.: 13/273,508

(22) Filed: Oct. 14, 2011

(65) Prior Publication Data

US 2012/0172482 A1 Jul. 5, 2012

(30) Foreign Application Priority Data

Dec. 29, 2010 (KR) ........................ 10-2010-0138324

(51) Int. Cl.
| | | |
|---|---|---|
| C09J 4/00 | (2006.01) | |
| C08F 283/04 | (2006.01) | |
| C09J 175/16 | (2006.01) | |
| C08G 18/72 | (2006.01) | |
| C08G 18/81 | (2006.01) | |
| C08G 18/71 | (2006.01) | |
| C08G 18/08 | (2006.01) | |
| C08G 18/67 | (2006.01) | |

(52) U.S. Cl.
CPC ............ C09J 175/16 (2013.01); C08G 18/722 (2013.01); C08G 18/8116 (2013.01); C08G 18/718 (2013.01); C08G 18/0823 (2013.01); C08G 18/672 (2013.01)
USPC .......... 156/331.7; 156/331.4; 522/90; 522/91; 522/93; 522/96; 522/97; 522/98; 525/123; 525/127; 525/455; 525/460

(58) Field of Classification Search
USPC ........... 522/90, 91, 93, 96, 97, 98; 156/331.4, 156/331.7; 525/123, 127, 455, 460
See application file for complete search history.

(56) References Cited

U.S. PATENT DOCUMENTS 8,044,235 B2 * 10/2011 Nozawa et al. ............... 560/347
2010/0273909 A1 * 10/2010 Ogawa et al. .................. 522/90

FOREIGN PATENT DOCUMENTS

| CN | 101314629 A | | 12/2008 |
|---|---|---|---|
| JP | 2006-104296 A | | 4/2006 |
| JP | 2006104296 A | * | 4/2006 |
| WO | WO 2005/090507 A1 | | 9/2005 |
| WO | WO 2008016146 | * | 7/2008 |
| WO | WO 2009/086491 A1 | | 7/2009 |

OTHER PUBLICATIONS

Document N_English Translation.*
Korean Office Action dated May 29, 2013.
Taiwanese Office Action in TW 100139355, dated Aug. 27, 2013 (Ha, et al.).
Taiwanese Search Report in TW 100139355, dated Aug. 22, 2013, with English translation (Ha, et al.).

* cited by examiner

*Primary Examiner* — Michael L Leonard
(74) *Attorney, Agent, or Firm* — Lee & Morse, P.C.

(57) ABSTRACT

An optical adhesive composition includes a urethane (meth) acrylate resin having at least one hydroxyl group and at least one vinyl group, the urethane (meth)acrylate resin having a curing contraction ratio expressed by Equation 1 of about 0 to about 3%; and an adhesion of about 30 to about 80 kgf:

Curing contraction ratio (%)=$(A-B)/A \times 100$,    [Equation 1]

where A is a specific gravity of the optical adhesive composition before curing, and B is a specific gravity of the solid optical adhesive composition after curing.

16 Claims, No Drawings

OPTICAL ADHESIVE COMPOSITION AND DISPLAY PANEL INCLUDING THE SAME

BACKGROUND

Embodiments relate to an optical adhesive composition and a display panel including the same. More particularly, embodiments relate to an optical adhesive composition that includes a urethane (meth)acrylate resin having at least one hydroxyl group and at least one vinyl group, and a display panel including the same.

SUMMARY

According to an embodiment, there is provided an optical adhesive composition including a urethane (meth)acrylate resin having at least one hydroxyl group and at least one vinyl group, the urethane (meth)acrylate resin having a curing contraction ratio expressed by Equation 1 of about 0 to about 3%; and an adhesion of about 30 to about 80 kgf:

$$\text{Curing contraction ratio (\%)} = (A-B)/A \times 100, \quad \text{[Equation 1]}$$

where A is a specific gravity of the optical adhesive composition before curing, and B is a specific gravity of the solid optical adhesive composition after curing.

The optical adhesive composition may have an elongation of about 200 to about 800% measured according to ASTM D412 after curing.

The optical adhesive composition may have an elastic modulus of about 15 to about 40 gf/mm$^2$ measured according to ASTM D412.

The urethane (meth)acrylate resin may be a copolymer of a urethane polymer having at least one hydroxyl group and a (meth)acrylic monomer having an isocyanate and a vinyl group.

The urethane polymer having at least one a hydroxyl group and the (meth)acrylic monomer having an isocyanate and a vinyl group may be polymerized at a mole ratio of about 1.5:1 to about 2.5:1.

The urethane polymer having at least one hydroxyl group may be a polymer obtained by polymerization of a polyol having at least two hydroxyl groups and at least one isocyanate compound selected from diisocyanate and triisocyanate at an equivalence ratio of about 1.3:1 to about 2:1.

The polyol may include at least one of ethylene glycol, polyethylene glycol, propylene glycol, polypropylene glycol, tetramethylene glycol, polytetramethylene glycol, 1,3-butanediol, 1,4-butanediol, 1,6-hexanediol, neopentyl glycol, 1,4-cyclohexane dimethanol, glycerin, sorbitol, pentaerythritol, toluenediamine, and diaminophenylmethane.

The isocyanate compound may include at least one of an isophorone compound, a hexamethylene compound, and a toluene compound.

The polyol may be propylene glycol, the isocyanate compound may be isophorone diisocyanate and 1,3,6-hexamethylene triisocyanate, and the (meth)acrylic monomer having an isocyanate and a vinyl group may be 2-isocyanatoethyl methacrylate.

The urethane (meth)acrylate resin may further include a silane group.

The urethane (meth)acrylate resin may be a copolymer of a urethane polymer having at least one hydroxyl group, 2-isocyanatoethyl methacrylate and 3-isocyanatopropyltriethoxysilane, the urethane polymer having a least one hydroxyl group being obtained by polymerization of a polypropylene, isophorone diisocyanate and 1,3,6-hexamethylene triisocyanate at an equivalence ratio of polypropylene to isophorone diisocyanate and 1,3,6-hexamethylene triisocyanate of about 1.3:1 to about 2:1.

The urethane (meth)acrylate resin may have a weight average molecular weight of about 1,000 to about 50,000 g/mol.

The urethane (meth)acrylate resin may be present in an amount of about 50 to about 89.3 wt % in the optical adhesive composition.

The optical adhesive composition may further include a photocurable monomer, a photoinitiator, a UV absorber, and an antioxidant.

The photocurable monomer may include at least one of a monomer having a hydroxyl group, a monomer having a carboxyl group, a monomer having an alicyclic group, and a monomer having an alkyl group.

The optical adhesive composition may include about 50 to about 89.3 wt % of the urethane (meth)acrylate resin having at least one hydroxyl group and at least one vinyl group, about 10 to about 40 wt % of the photocurable monomer, about 0.5 to about 6 wt % of the photoinitiator, about 0.1 to about 2 wt % of the UV absorber, and about 0.1 to about 2 wt % of the antioxidant.

The optical adhesive composition may further include a silane coupling agent.

A display panel may include the optical adhesive composition.

DETAILED DESCRIPTION

Korean Patent Application No. 10-2010-0138324, filed on Dec. 29, 2010, in the Korean Intellectual Property Office, and entitled: "Optical Adhesive Composition and Display-Panel Including the Same," is incorporated by reference herein in its entirety.

Example embodiments will now be described more fully hereinafter. However, embodiments may be embodied in different forms and should not be construed as limited to the embodiments set forth herein. Rather, the embodiments set forth herein are provided so that this disclosure will be thorough and complete, and will fully convey the scope of the invention to those skilled in the art.

According to an embodiment, an optical adhesive composition includes a urethane (meta)acrylate resin having at least one hydroxyl group and at least one vinyl group and has a curing contraction ratio of about 0 to about 3% and an adhesion of about 300 to about 80 kgf. The curing contraction ratio is expressed by Equation 1:

$$\text{Curing contraction ratio (\%)} = (A-B)/A \times 100,$$

where A is the specific gravity of the adhesive composition before curing and B is the specific gravity of the solid adhesive composition after curing.

The optical adhesive composition may be cured at a light energy per unit area of about 500 to about 8,000 mJ/cm$^2$, for example. In an implementation, curing may be performed with a light energy per unit area of about 1,000 to about 8,000 mJ/cm$^2$.

The adhesion may be measured as follows: the adhesive composition may be deposited between an upper glass and a lower glass, and the force of separation of the upper glass may be measured using a bond tester while the upper glass is pushed from a lateral side at a force of 200 kgf at 25° C. The adhesive composition may be deposited on a 1.5 cm×1.5 cm×1 mm upper glass, and a 2 cm×2 cm×1 mm lower glass may be placed thereon. The adhesive layer may be formed to a thickness of about 300 to about 700 μm. The separation force is measured while pushing the upper glass at a force of 200 kgf at 25° C. from the lateral side using a bond tester (Dage series 4000PXY).

The curing contraction ratio may be about 1.17 to about 1.84%, and the adhesion may be about 56 to about 62 kgf.

The optical adhesive composition may have an elongation of about 200 to about 800% measured according to ASTM D412 after curing, preferably about 200 to about 400%.

The optical adhesive composition may be cured with a light energy per unit area of about 500 to about 8,000 mJ/cm$^2$, for example. The elongation may be measured according to ASTM D412, for example. ISO 37 or JIS K6251 may also be used.

The optical adhesive composition may have an elastic modulus of about 15 to about 40 gf/mm$^2$. The elastic modulus may be measured using an Instron Series 1X/s Automated Materials Tester 3343, for example, after preparing a specimen using ASTM D412 and depositing and curing the adhesive composition on a release film.

The optical adhesive composition may be a liquid adhesive composition including a urethane (meth)acrylate resin having at least one hydroxyl group and at least one vinyl group. The optical adhesive composition may be such as to not generate bubbles when interposed between an indium tin oxide (ITO) film and a glass window layer.

In the specification, the terms "acrylate" and "(meth)acrylate" may refer to both acrylate and methacrylate, and the terms "acrylic" "(meth)acrylic" may refer to both acrylic and methacrylic.

The urethane (meth)acrylate resin may include at least one hydroxyl group and at least one vinyl group.

A typical urethane (meth)acrylate resin for an optical adhesive composition may be produced from a polymer having an isocyanate group obtained by reacting a polyol with an excess of an isocyanate compound. Since the isocyanate group may be chemically unstable, the polymer may be further polymerized with an acrylic monomer having a hydroxyl group and a double bond, thereby stabilizing the resin. Thus, the finally obtained typical urethane (meth)acrylate resin includes a vinyl group having a double bond, or an isocyanate group. By contrast, the urethane (meth)acrylate resin according to the present embodiments may be produced from a urethane polymer having at least one hydroxyl group by reaction of a polyol with a relatively small amount of an isocyanate compound. The urethane (meth)acrylate resin may optionally contain functional groups, such as a vinyl group, a silane group, or the like, to improve physical properties of the adhesive composition. For example, a vinyl group may be introduced to the urethane (meth)acrylate resin by reacting an acrylic monomer having an isocyanate and a vinyl group with a hydroxyl group of the urethane (meth)acrylate resin. Further, at least one silane group may be introduced to the urethane (meth)acrylate resin by reacting a monomer having a silane group with the hydroxyl group of the urethane (meth)acrylate resin.

The urethane (meth)acrylate resin may be prepared by a method including:

(1) polymerizing a polyol having at least two hydroxyl groups and an isocyanate compound at an equivalence ratio of about 1.3:1 to about 2:1 to provide a urethane polymer having at least one hydroxyl group; and (2) copolymerizing the urethane polymer having the hydroxyl group and an acrylic monomer having an isocyanate and a vinyl group to provide the urethane (meth)acrylate resin.

The urethane (meth)acrylate resin may be a copolymer of a urethane polymer having at least one hydroxyl group and an acrylic monomer having an isocyanate and a vinyl group.

The term "urethane polymer having at least one hydroxyl group" may denote a polymer including a urethane bond and having at least one hydroxyl group. The hydroxyl group may react with the isocyanate of the acrylic monomer to form a urethane bond, so that the urethane (meth)acrylate resin further includes at least one vinyl group in addition to the hydroxyl group.

The urethane polymer having the hydroxyl group may be a polymer of a polyol having at least two hydroxyl groups and an isocyanate compound. The polyol and the isocyanate compound may be polymerized at an equivalence ratio of about 1.3:1 to about 2:1, preferably about 1.4:1 to about 1.8:1.

The polyol may include at least one of ethylene glycol, polyethylene glycol, propylene glycol, polypropylene glycol, tetramethylene glycol, polytetramethylene glycol, 1,3-butanediol, 1,4-butanediol, 1,6-hexanediol, neopentyl glycol, 1,4-cyclohexane dimethanol, glycerin, sorbitol, and pentaerythritol, for example.

The isocyanate compound may include at least one of diisocyanate and triisocyanate, for example. In an implementation, the isocyanate compound may include at least one of an isophorone compound, a hexamethylene compound, and a toluene compound, without being limited thereto. Examples of the isocyanate compound may include isophorone diisocyanate, hexamethylene triisocyanate, 2,4-toluene diisocyanate, trimethylolpropane modified toluene diisocyanate, xylylene diisocyanate, blocked isocyanate, diphenyl methane diisocyanate, polymeric diphenyl methane diisocyanate, and hexamethylene diisocyanate.

The acrylic monomer having the isocyanate and the vinyl group may react with the urethane polymer having the hydroxyl group to form a urethane bond, so that the finally produced urethane (meth)acrylate resin has at least one hydroxyl group and at least one vinyl group. The urethane polymer having the hydroxyl group and the (meth)acrylic monomer having the isocyanate and the vinyl group may be polymerized at a mole ratio of about 1.5:1 to about 2.5:1, preferably about 1.7:1 to about 2.0:1.

The acrylic monomer having the isocyanate and the vinyl group may be a C5 to C15 (meth)acrylic acid ester having an isocyanate group. Examples of the acrylic monomer may include, for example, at least one of 2-isocyanatoethyl(meth)acrylate and 3-isocyanatopropyl(meth)acrylate.

The urethane polymer having the hydroxyl group and the urethane (meth)acrylate resin may be prepared by any suitable method, for example, by polymerization at about 60 to about 80° C. for about 4 to about 6 hours.

The urethane (meth)acrylate resin may further include a silane group to improve adhesion to glass. The silane group may be introduced to the urethane (meth)acrylate resin by reacting a monomer having a silane group with the hydroxyl group of the urethane (meth)acrylate resin. The monomer having the silane group may be a monomer including a moiety reactive with a hydroxyl group, for example, 3-isocyanatopropyl trimethoxysilane or 3-isocyanatopropyltriethoxysilane. The monomer having the silane group may be polymerized in an amount of about 0.1 to about 3 wt % in the urethane (meth)acrylate resin. Within this range, the urethane (meth)acrylate resin may have excellent adhesion to glass as compared with a urethane (meth)acrylate having no silane group. The addition of the silane group typically will not cause an increase in viscosity, so that a dispensing process can be smoothly performed.

The urethane (meth)acrylate resin may have a weight average molecular weight of about 1,000 to about 50,000 g/mol. Within this range, excellent film formability may be obtained after photo-curing, and, accordingly, excellent film strength and a superior elongation may be secured. Further, a dispensing process may be smoothly performed.

The urethane (meth)acrylate resin may be present in an amount of about 50 to about 89.3 wt %, preferably about 60 to about 84.8 wt %, in the optical adhesive composition. Within this range, a lower contraction ratio may be obtained after photo-curing, thereby minimizing stress on instruments. Further, excellent film formability may be ensured after photo-curing.

The optical adhesive composition may further include a photocurable monomer, a photoinitiator, a UV absorber, and an antioxidant in addition to the urethane (meth)acrylate resin having the hydroxyl group and the vinyl group.

Photocurable Monomer

The photocurable monomer may include at least one of a monomer having a hydroxyl group, a monomer having a carboxyl group, a monomer having an alicyclic group, and a monomer having an alkyl group. For example, the photocurable monomer may include a monomer having a hydroxyl group and a monomer having an alicyclic group.

The photocurable monomer may be present in an amount of about 10 to about 40 wt %, preferably about 14 to about 35 wt %, in the optical adhesive composition. Within this range, viscosity may be adjusted properly for a dispensing process, and a minimum contraction ratio may be obtained after photo-curing.

The monomer having the hydroxyl group may be a (meth)acrylic acid ester having a hydroxyl group. Examples of the (meth)acrylic acid ester having the hydroxyl group may include, for example, 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexane dimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclohexyl(meth)acrylate, and cyclohexane dimethanol mono(meth)acrylate, and the like. These (meth)acrylic acid esters may be used alone or as a mixture of two or more thereof. The monomer having the hydroxyl group may be present in an amount of about 0 to about 100 wt % or about 40 to about 60 wt % in the photocurable monomer. Within this range, excellent adhesion to glass materials, excellent color change and stability after evaluation of reliability may be obtained.

The monomer having the carboxyl group may include, for example, at least one of (meth)acrylic acid, itaconic acid, maleic acid, fumaric acid, and vinyl acetate. The monomer having the carboxyl group may be present in an amount of about 0 to about 100 wt % or about 40 to about 60 wt % in the photocurable monomer. Within this range, superior adhesion to glass materials may be secured and the viscosity of the optical adhesive composition may be effectively reduced.

The monomer having the alicyclic group may include a (meth)acrylic acid ester including a C4 to C20 homogenous or heterogeneous alicyclic group. Examples of the monomer having the alicyclic group may include at least one of isobornyl(meth)acrylate, cyclohexyl(meth)acrylate, and cyclopentyl(meth)acrylate. The monomer having the alicyclic group may be present in an amount of about 0 to about 100 wt % or about 40 to about 60 wt % in the photocurable monomer. Within this range, the viscosity of photo-curing materials may be easily adjusted and the refractive index of the composition may be effectively improved.

The monomer having the alkyl group may include a (meth)acrylic acid alkyl ester. The (meth)acrylic acid alkyl ester may include a (meth)acrylic acid ester having a linear or branched alkyl group with 1 to 20 carbon atoms in the ester moiety. Examples of the (meth)acrylic acid alkyl ester may include, for example, methyl(meth)acrylate, ethyl(meth)acrylate, propyl(meth)acrylate, n-butyl(meth)acrylate, t-butyl(meth)acrylate, iso-butyl(meth)acrylate, pentyl(meth)acrylate, hexyl(meth)acrylate, heptyl(meth)acrylate, octyl(meth)acrylate, nonyl(meth)acrylate, decyl(meth)acrylate, undecyl(meth)acrylate, and lauryl(meth)acrylate, and the like, and combinations thereof. The monomer having the alkyl group may be present in an amount of about 0 to about 100 wt % or about 40 to about 60 wt % in the photocurable monomer. Within this range, photo-curing may be effectively performed and the viscosity of photo-curing materials may be easily adjusted.

Photoinitiator

The photoinitiator may include any suitable compound that performs an excellent photo reaction in a UV wavelength range of about 200 to about 400 nm. Examples of the photoinitiator may include, for example, 1-hydroxycyclohexyl phenyl ketone, benzophenones, acetophenones, triazines, thioxanthones, benzoins, and oximes. Specific examples of the photoinitiator may include benzophenone, 4-phenylbenzophenone, hydroxybenzophenone, acrylated benzophenone, 4,4'-bis(dimethylamino)benzophenone, 4,4'-bis(diethylamino)benzophenone, 2,2'-diethoxyacetophenone, 2,2'-dibutoxyacetophenone, 2-hydroxy-2-methylpropiophenone, 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, thioxanthone, 2-methylthioxanthone, benzoin, benzoin methyl ether, and the like, and combinations thereof.

The photoinitiator may be present in an amount of about 0.5 to about 6 wt %, preferably about 1 to about 3 wt %, in the optical adhesive composition. Within this range, photo-curing may be smoothly performed and an increase in the viscosity of the photo-curing materials may not occur.

UV Absorber

The UV absorber may function to improve the optical stability of the adhesive composition. The UV absorber may include, for example, benzotriazole, benzophenone, and triazine compounds. Examples of the UV absorber may include 2-(benzotriazole-2-yl)-4-(2,4,4-trimethylpentane-2-yl)phenol, 2-(2'-hydroxy-5'-methylphenyl)benzotriazole, 2-[2'-hydroxy-3,5'-bis(α,α-dimethylbenzyl)phenyl]benzotriazole, 2-(2'-hydroxy-3',5'-di-t-butylphenyl) benzotriazole, 2,4-hydroxybenzophenone, 2,4-hydroxy-4-methoxybenzophenone, 2,4-hydroxy-4-methoxybenzophenone-5-sulfonic acid, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, and 2,4-diphenyl-6-(2-hydroxy-4-butoxyphenyl)-1,3,5-triazine and the like, and combinations thereof.

The UV absorber may be present in an amount of about 0.1 to about 2 wt %, preferably about 0.1 to about 1 wt % in the optical adhesive composition. Within this range, curing by weak UV may be prevented, thereby enhancing the storage stability of photo-curing materials.

Antioxidant

The antioxidant may function to prevent oxidation of the adhesive composition, thereby improving thermal stability. Examples of the antioxidant may include at least one of quinone, amine, phenol, and phosphite compounds, without being limited thereto. Examples of the antioxidant may include pentaerythritoltetrakis[3-(3,5-di-t-butyl-4-hydroxyphenyl)propionate] and tris(2,4-di-t-butylphenyl)phosphite.

The antioxidant may be present in an amount of about 0.1 to about 2 wt %, preferably about 0.1 to about 1 wt %, in the optical adhesive composition. Within this range, deterioration of materials by heat may be prevented and the storage stability of the composition may be improved.

The optical adhesive composition may further include a silane coupling agent to improve adhesion to glass. The silane coupling agent may include any suitable silane coupling agent such as, for example, trimethoxysilane, a polymerizable silicon compound having an unsaturated group, such as vinyltriethoxysilane, and (meth)acryloxypropyltrimethoxysilane; a silicon compound having an epoxy structure, such as 3-glycidoxypropyl trimethoxysilane, 3-glycidoxypropylmethyldimethoxysilane, and 2-(3,4-epoxycyclohexyl)ethyltrimethoxysilane; a silicon compound having an amino group, such as 3-aminopropyltrimethoxysilane, N-(2-aminoethyl)-3-aminopropyl trimethoxysilane, and N-(2-aminoethyl)-3-aminopropylmethyldimethoxysilane; and 3-chloropropyltrimethoxysilane.

The silane coupling agent may be present in an amount of about 2 to about 8 parts by weight, preferably about 4 to about 7 parts by weight based on 100 parts by weight of the urethane (meth)acrylate resin. Within this range, excellent adhesion to glass may be obtained, and adhesion to materials may be improved over time, so that a final product has high adhesion.

The optical adhesive composition may further include an organic solvent to dissolve the respective components. Examples of the solvent may include isopropyl alcohol, 2-ethylhexyl alcohol, methoxypentanol, butoxyethanol, ethoxyethoxyethanol, butoxyethoxyethanol, methoxypropoxypropanol, glycerol, ethylene glycol, texanol, alpha-terpineol, kerosene, mineral spirits and dihydroterpineol, diethylene glycol butyl ether, diethylene glycol ethyl ether, dipropylene glycol methyl ether, dihexylene glycol ethyl ether and the like, and combinations thereof.

Another embodiment provides a display panel including the optical adhesive composition. The display panel may be manufactured by depositing the adhesive composition between an ITO film and a glass window layer and curing with a light energy per unit area of about 1,000 to about 8,000 $mJ/cm^2$, for example.

The following Examples and Comparative Examples are provided in order to set forth particular details of one or more embodiments. However, it is to be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect. Details that are not included herein will be readily recognized and appreciated by those skilled in the art, and an explanation thereof is thus omitted.

Preparation Example 1

Preparation of urethane (meth)acrylate Resin

To a 1 L four-neck flask equipped with a stirrer, a thermometer connected to a reaction controller, a condenser, and a nitrogen inlet pipe, 933.01 g (equivalent: 1) of polypropylene glycol (PPG 3000), 47.64 g (equivalent: 0.69) of isophorone diisocyanate (IPDI), and 3.66 g (equivalent: 0.03) of 1,3,6-hexamethylene triisocyanate were added and polymerized at 70° C. for 3 hours. 15.44 g (equivalent: 0.16) of 2-isocyanatoethyl methacrylate was added to the flask and reacted at 45° C. for 3 hours while supplying nitrogen at 10 cc/min. After identifying the disappearance of the absorption spectrum of the isocyanate (2,770 $cm^{-1}$) using FT-IR, the reaction was terminated. Accordingly, a urethane (meth)acrylate resin having a hydroxyl group and a vinyl group was obtained.

Preparation Example 2

Preparation of urethane (meth)acrylate Resin

To a flask as in Preparation Example 1, 924.5 g (equivalent: 1) of polypropylene glycol (PPG 3000), 47.2 g (equivalent: 0.69) of isophorone diisocyanate (IPDI), and 3.6 g (equivalent: 0.03) of 1,3,6-hexamethylene triisocyanate were added and polymerized at 70° C. for 3 hours. 15.3 g (equivalent: 0.16) of 2-isocyanatoethyl methacrylate and 9.1 g (equivalent: 0.06) of 3-isocyanatopropyltriethoxysilane were added to the flask and reacted at 45° C. for 3 hours while supplying nitrogen at 10 cc/min. After identifying the disappearance of the absorption spectrum of the isocyanate (2,770 $cm^{-1}$) using FT-IR, the reaction was terminated. Accordingly, a urethane (meth)acrylate resin having a hydroxyl group, a vinyl group, and a silane group was obtained.

Preparation Example 3

Preparation of urethane (meth)acrylate Resin

A urethane (meth)acrylate resin having a hydroxyl group and a vinyl group was prepared in the same manner as in Preparation Example 1 except that 940.27 g (equivalent: 1) of polypropylene glycol (PPG 3000), 48.01 g (equivalent: 0.69) of isophorone diisocyanate (IPDI), 3.69 g (equivalent: 0.03) of 1,3,6-hexamethylene triisocyanate, and 7.78 g (equivalent: 0.08) of 2-isocyanatoethyl methacrylate were used.

Preparation Example 4

Preparation of urethane (meth)acrylate Resin

A urethane (meth)acrylate resin having a hydroxyl group, a vinyl group, and a silane group was prepared in the same manner as in Preparation Example 2 except that 931.6 g (equivalent: 1) of polypropylene glycol (PPG 3000), 47.57 g (equivalent: 0.69) of isophorone diisocyanate (IPDI), 3.65 g (equivalent: 0.03) of 1,3,6-hexamethylene triisocyanate, 7.71 g (equivalent: 0.08) of 2-isocyanatoethyl methacrylate, and 9.22 g (equivalent: 0.06) of 3-isocyanatopropyltriethoxysilane were used.

Preparation Example 5

Preparation of Comparative urethane (meth)acrylate Resin (Used in Comparative Examples 1 to 3)

To a 1 L four-neck flask equipped with a stirrer, a thermometer connected to a reaction controller, a condenser, and a nitrogen inlet pipe, 28.46 g (equivalent: 0.3) of polypropylene glycol, 0.27 g (equivalent: 0.03) of 1,4-butanediol, and 6.58 g (equivalent: 0.5) of dimethylolpropionic acid were added and maintained at 85° C. while supplying nitrogen at 100 cc/min. The mixture was stabilized at 70° C., and then a solution (Concentration: 10%) in which 0.06 g of dibutyltin laurate is dissolved in toluene, 20.70 g (equivalent: 0.95) of isophorone diisocyanate, and 1.92 g (equivalent: 0.05) of a hexamethylene diisocyanate trimer (Desmodur N3300, Bayer) were added and reacted for 6 hours. The mixture was cooled to 75° C., and then 3.11 g (equivalent: 0.19) of hydroxyethyl methacrylate was added and reacted for 3 hours. After identifying the disappearance of the absorption spectrum of the isocyanate (2,770 cm$^{-1}$) using FT-IR, the reaction was terminated.

Examples 1 to 7 and Comparative Examples 1 to 3

Details of components used in Examples 1 to 7 and Comparative Examples 1 to 3 are as follows.

(1) Urethane (meth)acrylate resin: Urethane (meth)acrylate resins prepared in Preparation Examples 1 to 5

(2) Photocurable monomer: 2-hydroxyethyl acrylate (LG Chem), acrylic acid (LG Chem), isobornyl acrylate (Mitsubishi Rayon), n-butyl acrylate (LG Chem)

(3) Photoinitiator: 1-hydroxy-cyclohexyl-phenyl-ketone (IC-184, Ciba Chemical)

(4) UV absorber: 2-(benzotriazole-2-yl)-4-(2,4,4-trimethylpentane-2-yl)phenol (Tinuvin 384-2, Ciba Chemical)

(5) Antioxidant: pentaerythritol tetrakis[3-(3,5-di-t-butyl-4-hydroxyphenyl)propionate] (Antioxidant 1010, Ciba Chemical)

(6) Silane coupling agent: Trimethoxysilane (Aldrich)

Examples 1 to 7

Preparation of Optical Adhesive Composition

A urethane (meth)acrylate resin, a photocurable monomer, a photoinitiator, a UV absorber, an antioxidant, and a silane coupling agent were mixed according to compositions listed in Table 1, thereby preparing an optical adhesive composition.

Comparative Examples 1 to 3

Preparation of Optical Adhesive Composition

An optical adhesive composition was prepared in the same manner as in Examples 1 to 7 according to compositions listed in Table 1.

Test: Evaluation of Properties of Optical Adhesive Composition

Each of the optical adhesive compositions of Examples and Comparative Examples was evaluated in terms of the following properties and the results are shown in Table 2.

<Evaluation Method>

1. Curing Contraction Ratio

The specific gravity of each adhesive composition in the liquid state before curing and the specific gravity of the adhesive composition in the solid state after curing were measured using a digital gravimeter (DME-220E, Shinko), and a curing contraction ratio was calculated by Equation 1. The adhesive composition was cured with a light energy per unit area of 6,000 mJ/cm$^2$.

$$\text{Curing contraction ratio (\%)}=(A-B)/A\times100, \quad \text{[Equation 1]}$$

where A is the specific gravity of the liquid adhesive composition before curing, and B is the specific gravity of the solid adhesive composition after curing.

2. Adhesion

Each adhesive composition was deposited on a 1.5 cm×1.5 cm×1 mm upper glass, and a 2 cm×2 cm×1 mm lower glass was placed thereon. The adhesive layer had a thickness of 500 μm. While pushing the upper glass at a force of 200 kgf at 25° C. from a lateral side, the separation force was measured using a bond tester (Dage series 4000PXY).

3. Tensile Strength and Elongation

A specimen was prepared and evaluated by ASTM D412. Each adhesive composition was deposited to a thickness of 500 μm on a release PET film and cured with a light energy per unit area of 6,000 mJ/cm$^2$. A ratio of an initial specimen length of 2 cm to a length when the specimen broke was measured at 23 to 27° C. using an Instron Series 1X/s Automated Materials Tester 3343, thereby calculating elongation and tensile strength.

4. Refractive Index

A specimen was prepared and evaluated by ASTM D1218. Each adhesive composition was deposited to a thickness of 500 μm on a release PET film and cured with a light energy per unit area of 6,000 mJ/cm$^2$. The refractive index of the prepared film was measured by ABBE5 (Bellingham/Stanley Ltd.).

5. Visible Light Transmittance

TABLE 1

| | | | Example | | | | | | | Comparative Example | | |
|---|---|---|---|---|---|---|---|---|---|---|---|---|
| | | | 1 | 2 | 3 | 4 | 5 | 6 | 7 | 1 | 2 | 3 |
| Urethane (meth) acrylate resin | Preparation example | 1 | 80 | 60 | — | — | — | — | — | — | — | — |
| | | 2 | — | — | 80 | 80 | — | — | — | — | — | — |
| | | 3 | — | — | — | — | 80 | — | — | — | — | — |
| | | 4 | — | — | — | — | — | 80 | 80 | — | — | — |
| | | 5 | — | — | — | — | — | — | — | 80 | 80 | 60 |
| Photocurable monomer having | Hydroxyl group | | 7.3 | 17.3 | 7.3 | 9.3 | 7.3 | 7.3 | 9.3 | 7.3 | 9.3 | 17.3 |
| | Carboxyl group | | — | 17.3 | — | — | — | — | — | — | — | 17.3 |
| | Alicyclic group | | 7.3 | — | 7.3 | — | 7.3 | 7.3 | 9.3 | 7.3 | 9.3 | — |
| | Alkyl group | | — | — | — | 9.3 | — | — | — | — | — | — |
| Photoinitiator | | | 1 | 1 | 1 | 1 | 1 | 1 | 1 | 1 | 1 | 1 |
| UV absorber | | | 0.2 | 0.2 | 0.2 | 0.2 | 0.2 | 0.2 | 0.2 | 0.2 | 0.2 | 0.2 |
| Antioxidant | | | 0.2 | 0.2 | 0.2 | 0.2 | 0.2 | 0.2 | 0.2 | 0.2 | 0.2 | 0.2 |
| Silane coupling agent | | | 4 | 4 | 4 | — | 4 | 4 | — | 4 | — | 4 |
| Total | | | 100 | 100 | 100 | 100 | 100 | 100 | 100 | 100 | 100 | 100 |

(Unit: Parts by weight in solid state)

Each adhesive composition was deposited to a thickness of 200 μm on a PET release film and cured at a light energy per unit area of 6,000 mJ/cm². Visible light transmittance was measured in a range of 400 to 800 nm using a Lambda 950 (Perkin-Elmer).

6. Elastic Modulus

A specimen was prepared and evaluated by ASTM D412. Each adhesive composition was deposited to a thickness of 500 μm on a PET release film and cured at a light energy per unit area of 6,000 mJ/cm². Elastic modulus was measured at 23 to 27° C. using an Instron Series 1X/s Automated Materials Tester 3343.

TABLE 2

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Curing contraction ratio (%) | 1.54 | 1.84 | 1.55 | 1.49 | 1.22 | 1.23 | 1.17 | 3.51 | 3.35 | 3.47 |
| Adhesion (kgf) | 58.5 | 61 | 62 | 57.5 | 57 | 60.5 | 56 | 48 | 43 | 49 |
| Tensile strength (gf/mm²) | 30 | 34 | 31 | 30 | 27 | 26 | 25 | 67 | 68 | 74 |
| Elongation (%) | 240 | 200 | 240 | 245 | 320 | 310 | 340 | 150 | 140 | 120 |
| Refractive index | 1.47 | 1.48 | 1.47 | 1.47 | 1.47 | 1.47 | 1.47 | 1.47 | 1.47 | 1.48 |
| Visible light transmittance (%) | 93.1 | 93.3 | 93.1 | 93.1 | 93.0 | 93.1 | 93.0 | 92.7 | 92.7 | 92.9 |
| Elastic modulus (gf/mm²) | 33.1 | 25.9 | 28.3 | 29.7 | 31.1 | 34.2 | 21.3 | 120.8 | 114.2 | 143.2 |

As shown in Table 2, the optical adhesive compositions using a urethane (meth)acrylate resin having a vinyl group (see Comparative Examples 1 to 3) exhibited inferior elongation, curing contraction ratio, and adhesion. By contrast, the adhesive compositions according to the present embodiments (see Examples 1 to 7), using a urethane (meth)acrylate resin having different functional groups from the comparative examples, exhibited an elongation of 200 to 800%, an adhesion of 30 to 80 kgf, and a curing contraction ratio of 0 to 3%.

By way of summation and review, a display panel may be classified as a portable display including a touch screen panel or an immobile display for a TV and monitor. Particularly, a display panel for a portable display may be vulnerable to impact as the size of the panel increases, and outdoor visibility may be an issue. Thus, an optical adhesive may be used to compensate for vulnerability to impact and to improve outdoor visibility. Optical adhesives may be divided into a film type and a liquid type. Although a film type optical adhesive is convenient for use, a film type optical adhesive can generate bubbles when disposed between an ITO film and a glass window layer and it may be difficult to eliminate the bubbles. A liquid type optical adhesive is deposited between an ITO film and a glass window layer and cured into a film using heat or light energy. The liquid type optical adhesive generates less bubbling than the film type. However, the adhesive may overflow during deposition. Accordingly, although bubbling is solved using liquid materials, liquid materials entail an overflowing problem. Thus, a proper process of using liquid materials may be important. Liquid materials contract while being cured by heat or light energy. Such contraction increases substrate stress, and the stress increases with increasing contraction.

The present embodiments advance the art by providing an optical adhesive having an improved adhesion to an ITO film or glass window layer, an improved curing contraction ratio, and improved elongation. Furthermore, the present embodiments may be a liquid material that does not generate bubbles when attached to a film or glass and may provide improved outdoor visibility.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. An optical adhesive composition, comprising:
a urethane (meth)acrylate resin having at least one hydroxyl group and at least one vinyl group, the urethane (meth)acrylate resin being a copolymer of a urethane polymer having at least one hydroxyl group and a (meth)acrylic monomer having an isocyanate and a vinyl group, the optical adhesive composition having a curing contraction ratio expressed by Equation 1 of about 0 to about 3%; and an adhesion of about 30 to about 80 kgf:

$$\text{Curing contraction ratio (\%)}=(A-B)/A \times 100, \quad \text{[Equation 1]}$$

where A is a specific gravity of the optical adhesive composition before curing, and B is a specific gravity of the solid optical adhesive composition after curing, wherein:
the urethane polymer having at least one hydroxyl group is a polymer obtained by polymerization of a polyol having at least two hydroxyl groups, a diisocyanate compound, and a triisocyanate compound,
the diisocyanate compound is an isophorone compound, and
the triisocyanate compound is a hexamethylene compound.

2. The optical adhesive composition as claimed in claim 1, wherein the optical adhesive composition has an elongation of about 200 to about 800% measured according to ASTM D412 after curing.

3. The optical adhesive composition as claimed in claim 1, wherein the optical adhesive composition has an elastic modulus of about 15 to about 40 gf/mm² measured according to ASTM D412.

4. The optical adhesive composition as claimed in claim 1, wherein the urethane polymer having at least one a hydroxyl group and the (meth)acrylic monomer having an isocyanate and a vinyl group are polymerized at a mole ratio of about 1.5:1 to about 2.5:1.

5. The optical adhesive composition as claimed in claim 1, wherein the polyol having at least two hydroxyl groups is polymerized with the diisocyanate and triisocyanate compounds at an equivalence ratio of about 1.3:1 to about 2:1.

6. The optical adhesive composition as claimed in claim 5, wherein the polyol includes at least one of ethylene glycol, polyethylene glycol, propylene glycol, polypropylene glycol, tetramethylene glycol, polytetramethylene glycol, 1,3-butanediol, 1,4-butanediol, 1,6-hexanediol, neopentyl glycol, 1,4-cyclohexane dimethanol, glycerin, sorbitol, and pentaerythritol.

7. The optical adhesive composition as claimed in claim 1, wherein:
the polyol is propylene glycol,
the diisocyanate compound is isophorone diisocyanate and the triisocyanate compound is 1,3,6-hexamethylene triisocyanate, and
the (meth)acrylic monomer having an isocyanate and a vinyl group is 2-isocyanatoethyl methacrylate.

8. An optical adhesive composition, comprising
a urethane (meth)acrylate resin that is a copolymer of a urethane polymer having at least one hydroxyl group, a (meth)acrylic monomer having an isocyanate and a vinyl group, and a silane monomer, the optical adhesive composition having a curing contraction ratio expressed by Equation 1 of about 0 to about 3%; and an adhesion of about 30 to about 80 kgf:

Curing contraction ratio (%)=$(A-B)/A \times 100$, [Equation 1]

where A is a specific gravity of the optical adhesive composition before curing, and B is a specific gravity of the solid optical adhesive composition after curing,
wherein:
the urethane polymer having at least one hydroxyl group is a polymer obtained by polymerization of a polyol having at least two hydroxyl groups, a diisocyanate compound, and a triisocyanate compound,
the diisocyanate compound is an isophorone compound, and
the triisocyanate compound is a hexamethylene compound.

9. The optical adhesive as claimed in claim 8, wherein the urethane (meth)acrylate resin is a copolymer of the urethane polymer having at least one hydroxyl group, 2-isocyanatoethyl methacrylate and 3-isocyanatopropyltriethoxysilane, the urethane polymer having a least one hydroxyl group being obtained by polymerization of a polypropylene, isophorone diisocyanate and 1,3,6-hexamethylene triisocyanate at an equivalence ratio of polypropylene to isophorone diisocyanate and 1,3,6-hexamethylene triisocyanate of about 1.3:1 to about 2:1.

10. The optical adhesive composition as claimed in claim 1, wherein the urethane (meth)acrylate resin has a weight average molecular weight of about 1,000 to about 50,000 g/mol.

11. The optical adhesive composition as claimed in claim 1, wherein the urethane (meth)acrylate resin is present in an amount of about 50 to about 89.3 wt % in the optical adhesive composition.

12. The optical adhesive composition as claimed in claim 1, wherein the optical adhesive composition further includes a photocurable monomer, a photoinitiator, a UV absorber, and an antioxidant.

13. The optical adhesive composition as claimed in claim 12, wherein the photocurable monomer includes at least one of a monomer having a hydroxyl group, a monomer having a carboxyl group, a monomer having an alicyclic group, and a monomer having an alkyl group.

14. The optical adhesive composition as claimed in claim 12, wherein the optical adhesive composition includes about 50 to about 89.3 wt % of the urethane (meth)acrylate resin having at least one hydroxyl group and at least one vinyl group, about 10 to about 40 wt % of the photocurable monomer, about 0.5 to about 6 wt % of the photoinitiator, about 0.1 to about 2 wt % of the UV absorber, and about 0.1 to about 2 wt % of the antioxidant.

15. The optical adhesive composition as claimed in claim 12, wherein the optical adhesive composition further includes a silane coupling agent.

16. A display panel comprising the optical adhesive composition of claim 1.

* * * * *